US010795439B2

(12) United States Patent
Chung et al.

(10) Patent No.: US 10,795,439 B2
(45) Date of Patent: Oct. 6, 2020

(54) INTERFACE DEVICE RECEIVING USER'S MOTION DATA AND PROVIDING EXTERNAL FORCE AND IMPACT

(71) Applicant: REALGAM CO., LTD., Sungnam-si, Gyeonggi-do (KR)

(72) Inventors: Yon Woo Chung, Seoul (KR); Bok Sung Oh, Anyang-si (KR); Yun Ho Lee, Anyang-si (KR)

(73) Assignee: REALGAM CO., LTD., Sungnam-si (KR)

( * ) Notice: Subject to any disclaimer, the term of this patent is extended or adjusted under 35 U.S.C. 154(b) by 36 days.

(21) Appl. No.: 16/311,507

(22) PCT Filed: Jan. 19, 2017

(86) PCT No.: PCT/KR2017/000640
§ 371 (c)(1),
(2) Date: Dec. 19, 2018

(87) PCT Pub. No.: WO2018/034397
PCT Pub. Date: Feb. 22, 2018

(65) Prior Publication Data
US 2019/0187791 A1 Jun. 20, 2019

(30) Foreign Application Priority Data

Aug. 16, 2016 (KR) .................. 10-2016-0103609
Jan. 18, 2017 (KR) .................. 10-2017-0008614

(51) Int. Cl.
*G09G 5/00* (2006.01)
*G06F 3/01* (2006.01)
(Continued)

(52) U.S. Cl.
CPC .............. *G06F 3/014* (2013.01); *G06F 3/016* (2013.01); *G06F 3/02* (2013.01); *G06F 3/0346* (2013.01); *G06F 3/0202* (2013.01)

(58) Field of Classification Search
CPC ........ G06F 3/014; G06F 3/016; G06F 3/0346; G06F 3/02; G06F 3/0202
(Continued)

(56) References Cited

U.S. PATENT DOCUMENTS

2003/0223844 A1* 12/2003 Schiele ............... A61H 1/0274
414/5
2010/0204804 A1   8/2010 Garrec
(Continued)

FOREIGN PATENT DOCUMENTS

KR   10-2015-0084154 A   7/2015
KR   10-2015-0123307 A   11/2015

OTHER PUBLICATIONS

International Search Report of PCT/KR2017/000640 dated May 15, 2017.

*Primary Examiner* — Adam J Snyder
(74) *Attorney, Agent, or Firm* — Sughrue Mion, PLLC (57) ABSTRACT

An interface device including: a first fixed portion and a first rotation portion which are fixed to a body; a first power portion which is connected to the first fixed portion and the first rotation portion and provides power to the first rotation portion; and a control unit which controls, when receiving a signal from an external device, the first power portion to control rotation of the first rotation portion, wherein the first power portion switches the first rotation portion to a free state of being rotatable by external force or a control state of being not rotatable by external force.

9 Claims, 7 Drawing Sheets

(51) Int. Cl.
*G06F 3/02* (2006.01)
*G06F 3/0346* (2013.01)

(58) Field of Classification Search
USPC ......................................................... 345/156
See application file for complete search history.

(56) References Cited

U.S. PATENT DOCUMENTS

| | | | |
|---|---|---|---|
| 2012/0142416 A1* | 6/2012 | Joutras | G06F 3/014 463/36 |
| 2014/0240109 A1* | 8/2014 | Aviles | G06F 3/016 340/407.1 |
| 2016/0018892 A1* | 1/2016 | Gu | G06F 3/016 345/156 |
| 2016/0139666 A1* | 5/2016 | Rubin | G06F 3/016 345/633 |
| 2016/0259417 A1* | 9/2016 | Gu | G06F 3/016 |
| 2016/0372008 A1* | 12/2016 | Lariviere | G06F 3/014 |

* cited by examiner

INTERFACE DEVICE RECEIVING USER'S MOTION DATA AND PROVIDING EXTERNAL FORCE AND IMPACT

CROSS REFERENCE TO RELATED APPLICATIONS

This application is a National Stage of International Application No. PCT/KR2017/000640 filed Jan. 19, 2017, claiming priority based on Korean Patent Application No. 10-2016-0103609 filed Aug. 16, 2016 and Korean Patent Application No. 10-2017-0008614 filed Jan. 18, 2017.

TECHNICAL FIELD

The present invention relates to an interface device, and more specifically, to an interface device which receives user's motion data and provides external force and impact.

BACKGROUND ART

Technology in which a user can easily experience virtual reality or can watch 3D images has been developed through development of a display device and sustainable development of a content network.

Particularly, for more realistic virtual reality experience, technology of controlling a virtual reality image by representing dynamic change on a virtual reality image in accordance with motion of a person was developed, and as technology related thereto, there are Korean Registered Patent No. 10-1485414 (May 3, 2013, Hand exoskeleton link structure for interaction with virtual objects).

However, the interface device of the technology can freely move without separate load even in a movement-impossible situation in a virtual space, and there is a limit in providing immersion.

Accordingly, in order to reduce such incongruity of virtual reality and reality and to satisfy requirement for further increasing immersion, a demand for an interface device which can be appropriately operated in accordance with a freely movable situation (free state) and a situation (control state) of moving by an internal motor has occurred.

SUMMARY OF INVENTION

Technical Problem

A technical problem of the present invention is to provide an interface device which can be appropriately operated in accordance with a freely movable situation (free state) and a situation (control state) of moving by an internal motor.

A technical problem of the present invention is not limited to the technical problem described above, and a person skilled in the art will clearly understand other technical problems which are not mentioned from the following description.

Solution to Problem

In order to achieve the technical problem, an embodiment of the present invention provides an interface device.

An interface device according to an embodiment of the present invention includes: a first fixed portion and a first rotation portion which are fixed to a body; a first power portion which is connected to the first fixed portion and the first rotation portion and provides power to the first rotation portion; and a control unit which controls, when receiving a signal from an external device, the first power portion to control rotation of the first rotation portion, wherein the first power portion switches the first rotation portion to a free state of being rotatable by external force or a control state of being not rotatable by external force in accordance with a signal of the control uni.

In the embodiment of the present invention, the first power portion includes a clutch unit, and the first rotation portion is switched to the free state or the control state by the clutch unit.

In the embodiment of the present invention, the first power portion further includes a power unit, and the clutch unit is switched to the control state when power is supplied by the power unit, and is switched to the free state when the supply of power is cut off by the power unit.

In the embodiment of the present invention, the interface device further includes a second rotation portion which is fixed to a body; and a second power portion which is connected to the first rotation portion and the second rotation portion and supplies power to the second rotation portion, wherein the control unit controls the second power portion to control rotation of the second rotation portion, and wherein the second power portion switches the second rotation portion to the free state of being rotatable by external force or the control state of being not rotatable by external force in accordance with a signal of the control unit.

In the embodiment of the present invention, the interface device further includes: an extension portion which is connected to the first rotation portion; and a grip portion which is coupled to the extension portion and is gripped by user's hand.

In the embodiment of the present invention, the grip portion includes a sub-interface device which is interworked with the external device.

In the embodiment of the present invention, the first power portion includes a rotation recognition unit, and the rotation recognition unit transmits a rotation signal to the control unit when the first rotation portion is rotated.

In the embodiment of the present invention, the interface device further includes a communication unit which transmits and receives a signal to and from the external device, wherein the communication unit transmits a control signal received from the external device to the control unit.

In the embodiment of the present invention, the control unit grasps, when receiving the rotation signal from the rotation recognition unit by rotation of the first rotation portion, a rotation angle on the basis of the rotation signal, generates a rotation angle signal including the rotation angle, and transmits the rotation angle signal to the external device through the communication unit, or switches the first rotation portion to the free state or the control state in accordance with the control signal when receiving the control signal from the external device through the communication unit.

In the embodiment of the present invention, the first power portion includes an input unit which reduces the rotational force transferred from the power unit, engages with the clutch unit, and transfers rotational force to the clutch unit, and an output unit which engages with the clutch unit, receives the rotational force from the clutch unit, and outputs the rotational force to the first rotation portion or receive rotation of the first rotation portion, and wherein the clutch unit controls the rotation of the output unit.

Advantageous Effects of Invention

According to the embodiment of the present invention, since the interface device can implement the free state and the control state, it is possible to improve immersion.

Advantages of the present invention are not limited to the above-described advantage, and should be understood as including all advantages which can be inferred from configurations of the present invention described in Detailed Description or Claims of the present invention.

DESCRIPTION OF EMBODIMENTS

Hereinafter, the present invention will be described with reference to the accompanying drawings. However, the present invention may be embodied in various different forms, and is not limited to embodiments described herein. In order to clearly describe the present invention in the drawings, parts which are not related to the description are omitted, and similar reference numerals and signs are given to similar parts throughout Specification.

Throughout Specification, when it is described that a certain part is "connected (coupled, contacted, or combined), to the other part, this includes a case of "indirect connection" with another member interposed therebetween as well as a case of "direct connection". In addition, when it is described that a certain part "includes" a certain constituent element, it means that the part does not exclude another constituent element but may further have another constituent element unless otherwise described.

Terms used in Specification are used to merely explain a specific embodiment, and does not intent to limit the present invention. Singular expression includes plural expression unless clearly differently meaning contextually. In Specification, terms such as "include" or "have" are to designate that there are features, numerals, steps, operations, constituent elements, components, or combination thereof described in Specification, but it should be understood that existence or addition possibility of one or more other features, numerals, steps, operations, constituent elements, components, or combination thereof is not excluded in advance.

Hereinafter, embodiments of the present invention will be described with reference to the accompanying drawings.

Figure 1:
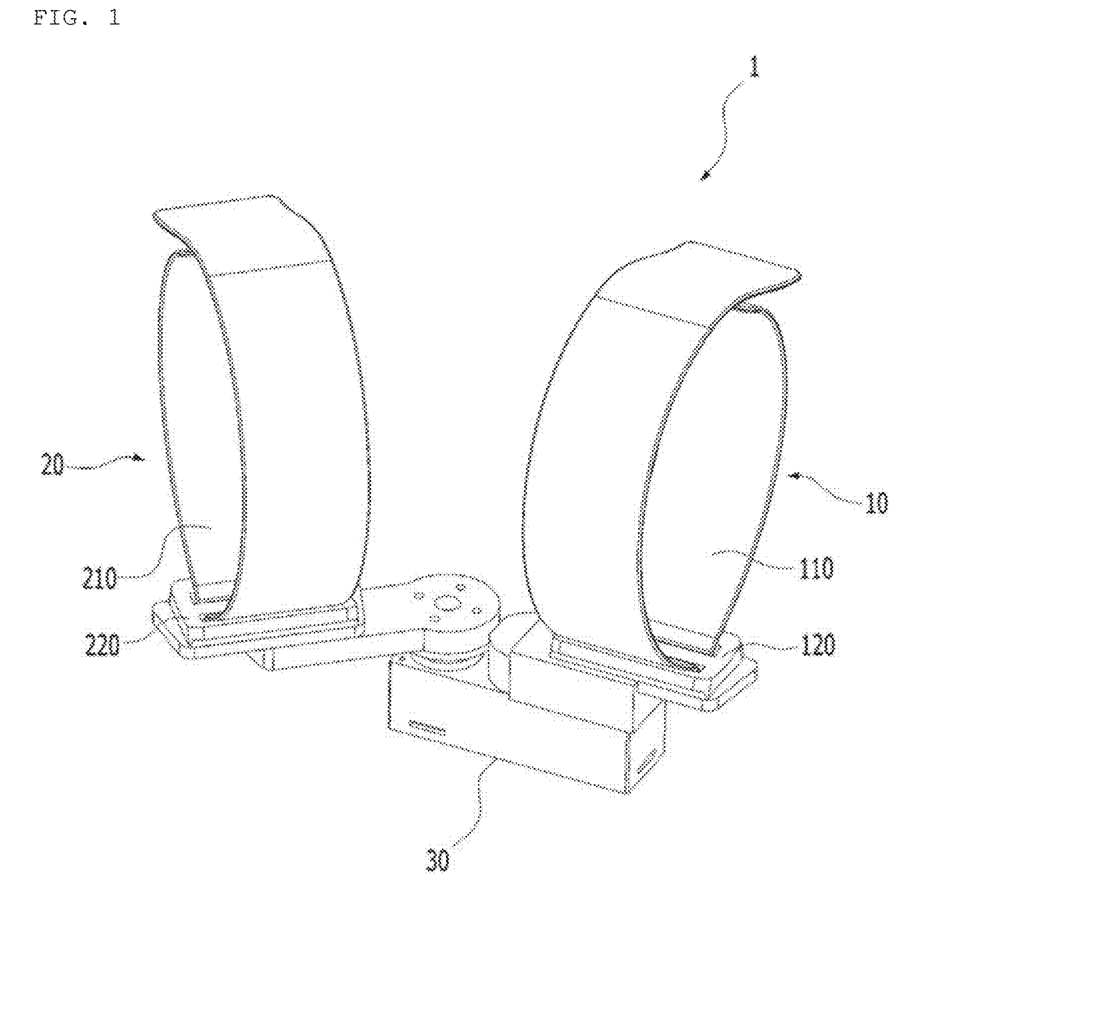
FIG. 1 is a diagram illustrating an interface device according to an embodiment of the present invention.

FIG. 1 is a diagram illustrating an interface device 1 according to an embodiment of the present invention.

Referring to FIG. 1, an interface device 1 according to an embodiment of the present invention includes a first fixed portion 10, a first rotation portion 20, and a first power portion 30. The first fixed portion 10 and the first rotation portion 20 are constituent elements fixed or attached around a joint of user's body, and may include body fixing members 110 and 210 and connection members 120 and 220. The body fixing members 110 and 210 are constituent elements which are fixed to user's body and couple the interface device 1 to user's body, and it is preferable that they are formed of a flexible material or a Velcro material to be variable in accordance with a thickness of user' body, but they are not limited thereto. FIG. 1 illustrates that the body fixing members 110 and 210 are formed in a ring shape.

The connection members 120 and 220 are constituent elements which connect the first fixed portion 10 or the first rotation portion 20 to the first power portion 30, and may not be required when the body fixing members 110 and 210 are directly connected to the first power portion 30.

The first power portion 30 is a constituent element which transfers rotation of the first rotation portion 20 to the control unit or switches the first rotation portion 20 to a free state of being rotatable by external force or a control state of being not rotatable by external force in accordance with a control signal received from the control unit. The first power portion 30 may be connected to the first fixed portion 10, and may be connected to the first rotation portion 20 to be rotatable. In this case, n power portions and n rotation portions may be formed as many as the number of rotation directions of a joint.

Figure 2:
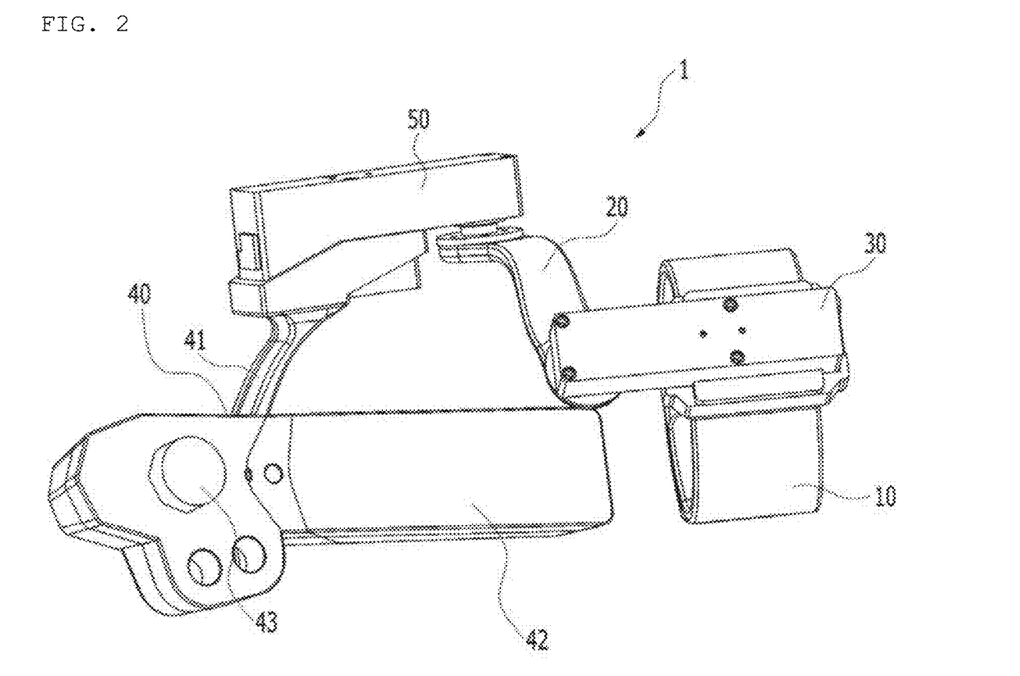
FIG. 2 is a diagram illustrating an interface device according to another embodiment of the present invention.
Figure 3:
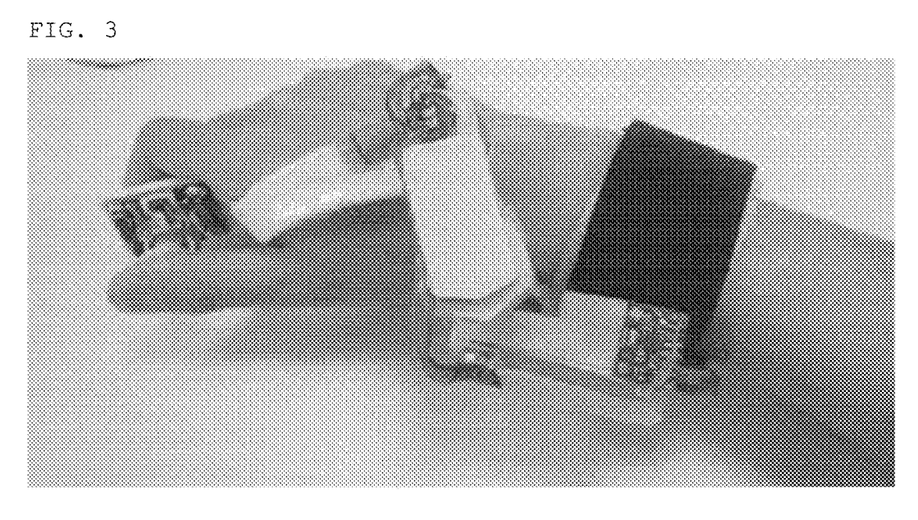
FIG. 3 is a diagram illustrating that the interface device according to the embodiment of the present invention is worn.

FIG. 2 is a diagram illustrating an interface device 1 according to another embodiment of the present invention, and FIG. 3 is a diagram illustrating that an interface device 1 according to another embodiment of the present invention is worn.

The first rotation portion 20 of the interface device 1 according to the embodiment of the present invention may have one area formed in a curved bar shape. In the first rotation portion 20 having one area having the curved bar shape, the curved area may be inserted between a joint and a joint such as between fingers, or may be connected, when there is the other power unit in addition to the first power portion 30, to the other power portion.

In addition, the interface device 1 according to the embodiment of the present invention may further include a second power portion 50 and a second rotation portion 40. The second power portion 50 is a constituent element which transfers rotation of the second rotation portion 40 to the control unit or switches the second rotation portion 40 to a free state of being rotatable by external force or a control state of being not rotatable by external force in accordance with a control signal received from the control unit, and may be connected to the first rotation portion 20 and the second rotation portion 40. In this case, the second power portion 50 may be connected to the first rotation portion 20 to be rotatable. Since the first power portion 30 and the second power portion 50 are connected by the first rotation portion 20 having the curved bar shape, the first power portion 30 may control rotation in a first direction, and the second power portion 50 may control rotation in a second direction.

The second rotation portion 40 is a constituent element which is switched to a free state or a control state by the second power portion 50. The second rotation portion 40 may include a connection portion 41 and a grip portion 42. The connection portion 41 is connected to the second power portion 50, and may be inserted between a joint and a joint such as between fingers. One end of the connection portion 41 is connected to the grip portion 42, and the grip portion 42 is formed to be gripped by user's hand. In this case, according to the embodiment of the present invention, the grip portion 42 may be provided with a sub-interface device 43. FIG. 2 illustrates a joystick formed as the sub-interface device 43, and the joystick may be formed at a position corresponding to user's thumb to be controlled by user's thumb. The sub-interface device 43 may be variously formed such as a wheel or button in addition to the joystick. FIG. 3 illustrates that a user wears the interface device 1 according to the embodiment of the present invention.

Figure 4:
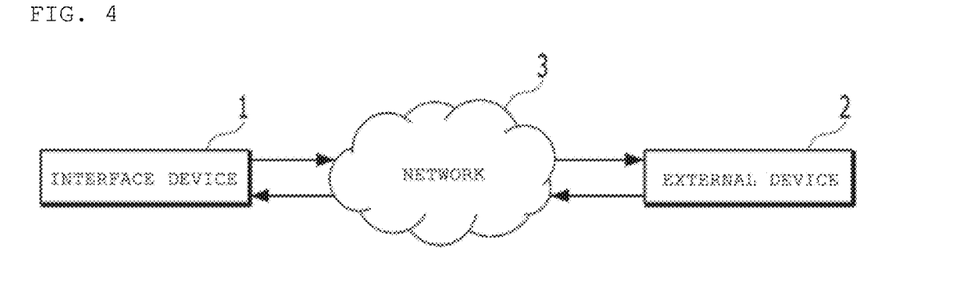
FIG. 4 is a diagram illustrating an interface device connected to an external device.
Figure 5:
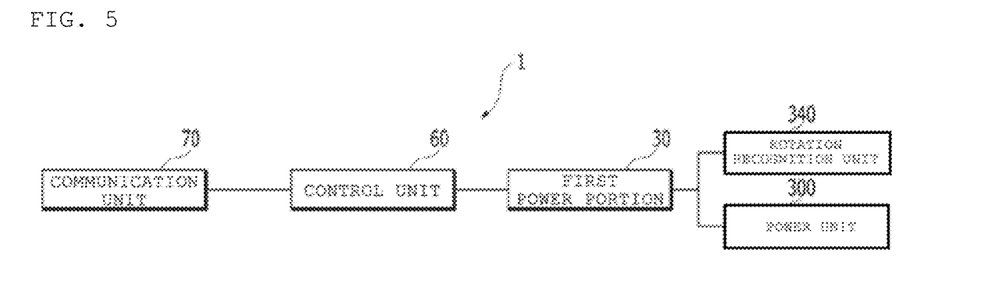
FIG. 5 is a diagram illustrating a configuration of an interface device according to an embodiment of the present invention.

FIG. 4 is a diagram illustrating the interface device 1 connected to an external device 2, and FIG. 5 is a diagram illustrating a configuration of the interface device 1 according to the embodiment of the present invention.

The external device 2 means a device which can receive a signal input from the interface device 1 and can transmit a control signal.

The interface device 1 is a constituent element which recognizes movement of user's joint, generates a signal, and transmits the signal to the external device 2 or receives a control signal from the external device 2 to control movement of user's body, and may further include a control unit 60, a communication unit 70, a rotation recognition unit 340 formed in the first power portion 30, and a power unit 300. When there is a second power portion 50, the second power portion 50 has the same configuration as that of the first power portion 30.

The communication unit 70 performs a function of transmitting and receiving a signal through a network 3. In the present invention, the communication unit 70 receives a control signal through the network 3 and transmits the control signal to the control unit 60, or transmits a rotation angle signal generated in accordance with rotation of the first rotation portion 20 to the external device 2. In other words, the control unit 60 receives a rotation signal from the rotation recognition unit 340 in accordance with rotation of the first rotation portion 20, grasps a rotation angle from the rotation signal, transmits a rotation angle signal to the communication unit 70 to be transmitted to the external device 2.

The rotation recognition unit 340 is a constituent element which is connected to the first rotation portion 20, generates a rotation signal based on rotation of the first rotation portion 20, and transmits the rotation signal to the control unit 60. In the present invention, it is preferable that the rotation recognition unit 340 is configured including at least one of sensors measuring change in value through user's movement such as a variable resistor, an acceleration sensor, a gyro sensor, and a tilt sensor, and hereinafter a case where the rotation recognition unit 340 is a variable resistor will be described as an example. When the rotation recognition unit 340 is a variable resistor, the control unit 60 can grasp a rotation angle of the first rotation portion 20 with change in resistance value.

The power unit 300 is a constituent element which is operated when receiving a control signal from the control unit 60. The first rotation portion 20 can be switched to a free state or a control state in accordance with the operation of the power unit 300.

The control unit 60 is a constituent element which controls overall operations for each constituent element of the interface device 1, and performs a signal processing function and the like. In the present invention, the control unit 60 grasps a rotation angle through the rotation signal transmitted from the rotation recognition unit 340 formed in the first power portion 30, generates a rotation angle signal, and may transmit the rotation angle signal to the external device 2 through the communication unit 70.

In addition, the control unit 60 determines, when receiving a control signal from the external device 2 through the communication unit 70, whether the control signal is a power unit operation signal. When the control signal is the power unit operation signal, the control unit 60 operates the power unit 300. When the control signal is a power unit stop signal, the control unit 60 stops the power unit 300 to switch the first rotation portion 20 to a control state or a free state. In this case, the control unit 60 and the first power portion 30 may be connected to the control unit 60 by a wire.

Detailed configurations and operation processes of the first power portion 30 switching the first rotation portion 20 to the control state or the free state through the power unit 300 will be described in detail hereinafter.

Figure 6:
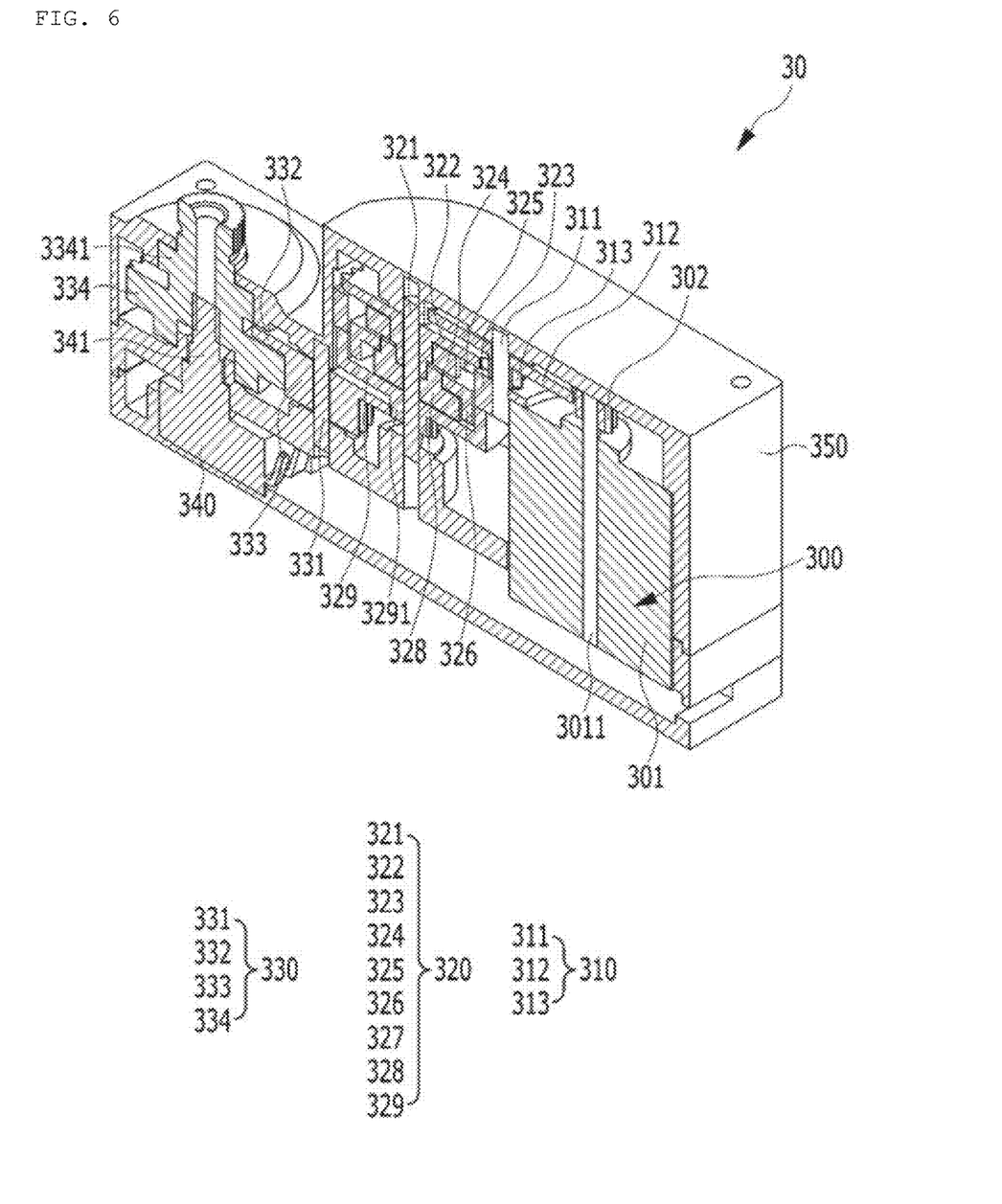
FIG. 6 is a diagram illustrating a first power portion of an interface device according to an embodiment of the present invention.
Figure 7:
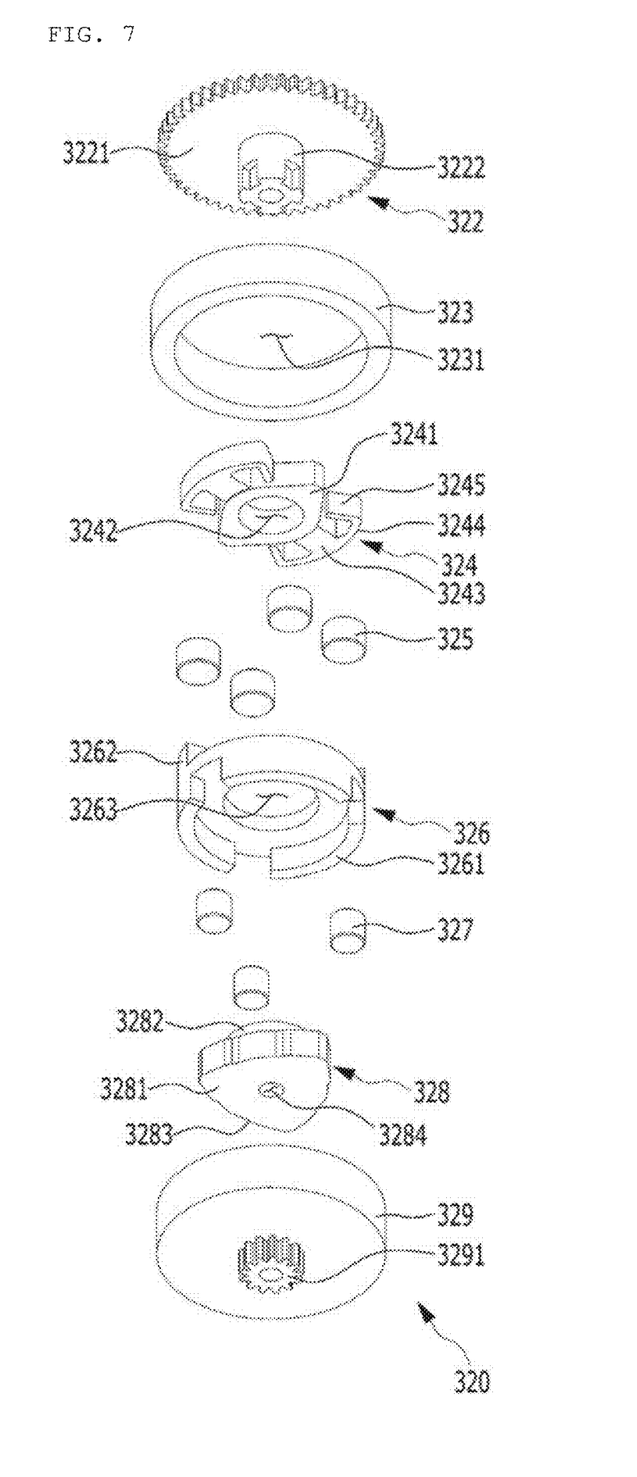
FIG. 7 is an exploded diagram of a clutch unit of an interface device according to an embodiment of the present invention.

FIG. 6 is a diagram illustrating a first power portion 30 of the interface device 1 according to the embodiment of the present invention, and FIG. 7 is an exploded diagram of a clutch unit 320 of the interface device 1 according to the embodiment of the present invention.

The first power portion 30 includes a housing 350, a power unit 300 accommodated in the housing 350, an input unit 310, a clutch unit 320, and an output unit 330.

The power unit 300 is a constituent element which generates rotational force and transfers the rotational force to the input unit 310, the input unit 310 is a constituent element which receives the rotational force generated from the power unit 300, the clutch unit 320 is a constituent element which switches the first rotation portion 20 connected to the output unit 330 to a control state or a free state by the rotational force transferred from the input unit 310, and the output unit 330 is a constituent element which receives the rotational force from the clutch unit 320 and outputs the rotational force to the first rotation portion 20 or receives the rotation of the first rotation portion 20. According to the embodiment of the present invention, the clutch unit 320 can be switched to the control state when power is supplied by the power unit 300, and can be switched to the free state when the supply of power is cut off by the power unit 300. In addition, the power unit 300 and the clutch unit 320 may be directly connected without the input unit 310 to receive power (rotational force).

The power unit 300 includes a motor 301 which is provided with a motor shaft 3011, and a motor gear 302 which is formed on the motor shaft 3011. Rotational force of the motor 301 is transferred to the motor gear 302 through the motor shaft 3011.

The input unit 310 includes a first shaft 311, a first gear 312, and a second gear 313. The first shaft 311 is coupled to the housing 350 to be disposed in parallel to the motor shaft 3011, and the first gear 312 engages with the motor gear 302 and receives the rotational force of the motor gear 302. In this case, it is preferable that the first gear 312 is formed with a diameter larger than a diameter of the motor gear 302 to reduce the rotation speed of the motor gear 302. The second gear 313 is formed on the lower surface of the first gear 312, and may be rotated in accordance with the rotation of the first gear 312.

The clutch unit 320 is a constituent element which switches the first rotation portion 20 to a free state or a control state, includes a second shaft 321, a power unit connection portion 322, a first inner housing 329, a second inner housing 326, a first rotation transfer portion 328, and first roller portions 327, and may further include a speed change portion (not illustrated) or an attachment and detachment module coupled to the second inner housing 326 according to the embodiment of the present invention. The speed change portion (not illustrated) is a constituent element which changes relative rotation speeds of the first inner housing 329 and the second inner housing 326 to attach or detach the first roller portions 327 to or from the first inner housing 329. In this case, the speed change portion (not illustrated) is formed in a friction plate shape to change the speed of the second inner housing 326 by friction, but is not limited thereto, and may be formed in various forms such as an electromagnet.

The attachment and detachment module includes a third inner housing 323, a second rotation transfer portion 324, and second roller portions 325, and is a constituent element which changes relative rotation speeds of the first inner housing 329 and the second inner housing 326 to attach or detach the first roller portions 327 to or from the first inner housing 329. The first inner housing 329 can be rotated in accordance with rotation of the first roller portions 327 by the attachment and detachment module.

The second roller portions 325 and the second rotation transfer portion 324 are constituent elements which are rotated by receiving rotational force from the second inner housing 326, and are inserted to a through-hole 3231 of the third inner housing 323. The second roller portions 325 may be formed in a cylindrical shape similarly to the first roller portions 327, in which one surface may come in contact with the power unit connection portion 322 and the other surface may come in contact with the second inner housing 326. In this case, the second inner housing 326 may be provided with one or more second arc portions 3262 along the circumference on the other surface thereof. The second roller portions 325 are positioned between the second arc portions 3262, and is pushed and rotated in accordance with rotation of the second inner housing 326. It is preferable that the number or second arc portions 3262 is a half of the number of second roller portions 325. For example, when the number of second roller portions 325 is n, the number of second arc portions 3262 may be n/2 (n≥2).

When the second roller portions 325 are rotated, the second rotation transfer portion 324 coming in contact with the second roller portions 325 are also pushed and rotated in accordance with the rotation of the second roller portions 325. In this case, since the second arc portions 3262 are positioned on both sides of the second roller portions 325, the rotation transfer portion 324 which is in a traveling direction irrespective of the rotation direction (forward rotation, reverse rotation) of the second inner housing 326 can be also pushed and rotated.

The second rotation transfer portion 324 is a constituent element which is formed of a material having dynamic stability and generates rotation speed difference between the first rotation transfer portion 328 and the second inner housing 326. Due to the rotation speed difference between the first rotation transfer portion 328 and the second housing 326, the first roller portions 327 can be attached to the inner circumferential surface of the first housing 329 and the outer circumferential surface of the first arc portion 3261 on the rotation direction side. In this case, the third extension portions 3245 are positioned on both sides of the first extension portion 3243, and it is possible to generate rotation speed difference between the first rotation transfer portion 328 and the second housing 326 irrespective of the rotation direction (forward rotation, reverse rotation).

The speed change portion (not illustrated) and the attachment and detachment module are freely rotated with respect to the first inner housing 329 by attachment and detachment of the first roller portions 327 and the first inner housing 329, or are rotated by the motor 301. In other words, it is possible to implement a free state and a control state of the first rotation portions 20 by attachment and detachment of the first roller portions 327 and the first inner housing 329.

The second shaft 321 is coupled to the housing 350 to be disposed in parallel to the first shaft 311. The power unit connection portion 322 is provided with a through-hole to which the second shaft 321 is inserted, and is coupled to the second shaft 321 to be rotatable. In this case, the power unit connection portion 322 is a constituent element which transfers rotational force of the second gear 313 to the first rotation transfer portion 328, and includes a disc 3221 and a rotation shaft 3222 formed at the center of the disc 3221. Teeth of a gear engaging with the second gear 313 are formed on the outer circumferential surface of the disc 3221 to protrude outwards from the outer circumferential surface. Accordingly, the power unit connection portion 322 is rotated together in accordance with rotation of the second gear 313.

The rotation shaft 3222 of the power unit connection portion 322 can be inserted with the first rotation transfer portion 328 and the second rotation transfer portion 324. The first rotation transfer portion 328 is connected to the power unit connection portion 322 and is rotated together in accordance with rotation of the power unit connection portion 322. The first rotation transfer portion 328 may include a plate-shaped main body 3281 which is provided with a through-hole 3284 in a length direction and a rotation center shaft 3282 which extends from one surface of the main body 3281 in a vertical direction, and the roller contact surface 3283 for contact with the first roller portions 327 may be formed on the outer circumferential surface of the main body 3281.

In this case, the first rotation transfer portion 328 may be positioned in the second inner housing 326. The second inner housing 326 is formed of a disc provided with a through-hole 3263, one or more second arc portions 3262 are formed along the circumference thereof on one surface thereof, and one or more first arc portions 3261 are formed along the circumference thereof on the other surface thereof. In this case, the first roller portions 327 are disposed between the first arc portions 3261, the first roller portions 327 are pushed and rotated in accordance with rotation of the first rotation transfer portion 328, and the second inner housing 326 provided with the first arc portions 3261 is also pushed and rotated together. The second roller portions 325 are disposed on both sides of the second arc portion 3262, and the second roller portions 325 is also pushed and rotated in accordance with rotation of the second inner housing 326.

The third inner housing 323 which prevents the second roller portions 325 from escaping may be disposed on the lower surface of the power unit connection portion 322, the third inner housing 323 is provided with a through-hole 3231 in a length direction, and the second roller portions 325 and the second rotation transfer portion 324 are inserted into the through-hole 3231 of the third inner housing 323. The first inner housing 329 which prevents the first roller portions 327 from escaping may be disposed on the lower surface of the third inner housing 323. The first inner housing 329 is provided with a through-hole in a length direction and can be coupled to the second shaft 321, and the first roller portions 327, the first rotation transfer portion 328, and the second inner housing 326 are placed in the through-hole. In addition, the first inner housing 329 may be provided with a third gear 3291 on the lower surface thereof, and the third gear 3291 is also rotated together in accordance with rotation of the first inner housing 329.

The second roller portions 325 are disposed to be separated with the second rotation transfer portion 324 interposed therebetween, and the second rotation transfer portion 324 is formed of a material having dynamic stability, and can reduce the rotation speed of the second roller portions 325, that is, the rotation speed of the second inner housing 326.

According to the embodiment of the present invention, the second rotation transfer portion 324 includes a body 3241, first extension portions 3243 extending from the body 3241, second extension portions 3244 extending from the first extension portions 3243, and third extension portions 3245 extending from the second extension portions 3244.

The body 3241 may be formed of an oval cylinder provided with a through-hole 3242 at the center thereof, and the rotation shaft 3222 of the power unit connection portion 322 can be inserted to the through-hole 3242. The first extension portion 3243 may be formed to extend vertically from the body 3241, and the second extension portions 3244 may be vertically bent and extend from one end of the first extension portion 3243 to both sides. The third extension portions 4345 may be vertically bent and extend from one end of each second extension portion 3244 toward the body 3241.

In this case, the first extension portions 3243 to the third extension portions 3245 may be formed integrally. In addition, the first extension portions 3243 to the third extension portions 3245 or the third extension portions 3245 are formed of a material having dynamic stability, and the third extension portions 3245 may be bent toward the first extension portions 3243 by external force. In this case, the second roller portions 325 are disposed to come in contact with the third extension portions 3245.

More specifically, the second roller portions 325 are pushed and rotated by the second arc portion 3262 in accordance with rotation of the second inner housing 326, and the second rotation transfer portion 324 is pushed and rotated by the second roller portions 325. In this case, the third extension portions 3245 of the second rotation transfer portion 324 coming in contact with the second roller portions 325 are bent toward the first extension portions 3243, and the attachment of the third inner housing 323 engaging with the second rollers 325 is released, thereby rotating the third extension portions 3245. In this case, the rotation speed of the second inner housing 326 is reduced by force pushing the third extension portions 3245 to change the relative rotation speed of the first rotation transfer portion 328 and the second inner housing 326.

Rotation speed difference between the first rotation transfer portion 328 and the second inner housing 326 occurs, the first roller portions 327 are attached to the first inner housing 329, and the first inner housing 329 is rotated together with the second inner housing 326 by the first roller portions 327 coming in close contact. In other words, in a state where the rotational force of the motor 301 is being transferred to the output unit 330 through the input unit 310 and the clutch unit 320, the clutch unit 320 may be in the control state where the output unit 330 cannot be freely moved or is restricted by the external force.

When the first roller portions 327 attached to the first inner housing 329 is detached from the first inner housing 329, the first inner housing 329 is freely movable by external force. In other words, the clutch unit 320 may be in the free state where the output unit 330 is freely movable by external force. The control state and the free state of the clutch unit 320 will be described in more detail with reference to FIGS. 8A and 8B and FIGS. 9A and 9B.

The output unit 330 includes a third shaft 331, a fourth gear 332, a fifth gear 333, and a sixth gear 334. The third shaft 331 is coupled to the housing 350 to be disposed in parallel to the second shaft 321. The fourth gear 332 is provided with a through-hole to which the third shaft 331 is inserted, is coupled to the third shaft 331 to be rotatable, engages with the third gear 3291, and receives rotational force of the third gear 3291.

The fifth gear 333 is formed to protrude downwards from the lower surface of the fourth gear 332. Since the fifth gear 333 is connected to one surface of the fourth gear 332, the fifth gear 333 is rotated together in accordance with rotation of the fourth gear 332.

The rotation recognition unit 340 is a constituent element which detects an angle of the sixth gear 334, is positioned in one area of the housing 350, and is provided with a measurement shaft 341 for grasping an angle of the sixth gear at the center thereof. The sixth gear 334 is provided with a through-hole capable of being coupled to the measurement shaft 341, is coupled to the measurement shaft 341, engages with the fifth gear 333, and transfers rotational force transferred from the fifth gear 333 to the measurement shaft 341.

Figures 8A, 8B:
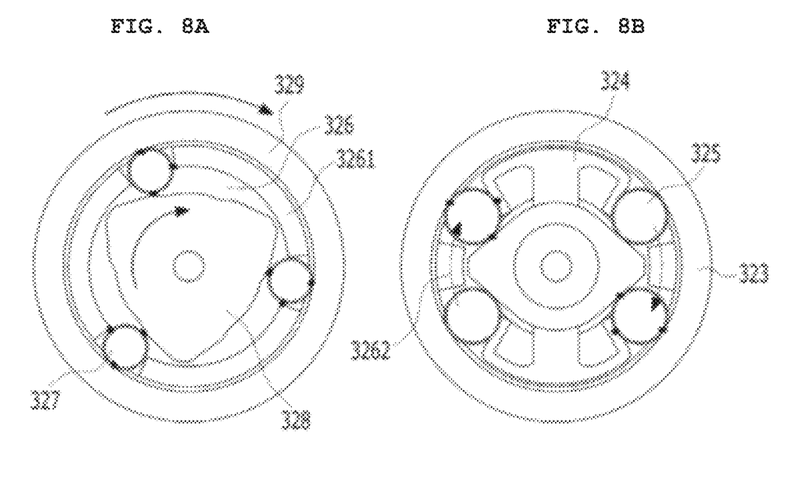
FIGS. 8A and 8B are diagrams illustrating a clutch unit at the time of switching to a control state of an interface device according to an embodiment of the present invention.

According to the embodiment of the present invention, the sixth gear 334 may further include an extension portion 3341 formed to vertically extend from one surface thereof and protruding out of the housing 350, and the extension portion 3341 may be connected to the first rotation portion 20. The extension portion 3341 may output the rotational force transferred from the clutch unit 320 out of the housing 340, or may transfer the rotation of the first rotation portion 20 to the rotation recognition unit 340. In other words, the rotation recognition unit 340 can grasp a rotation angle of the first rotation portion 20. When there is the n-th power portion in addition to the first power portion 30, the configuration of the n-th power portion is the same as the configuration of the first power portion 30. FIGS. 8A and 8B are diagrams illustrating the clutch unit 320 at the time of switching to a control state of the interface device 1 according to the embodiment of the present invention. FIG. 8A is a cross-sectional view of the first inner housing 329, the second inner housing 326, the first rotation transfer portion 328, and the like at the time of switching to the control state, and FIG. 8B is a cross-sectional view of the third inner housing 323, the second rotation transfer portion 324, and the like at the time of switching to the control state. In this case, the control state is a state where the power unit connection portion 322 is rotated by the second gear 313 engaging with the disc, the first roller portions 327 are attached to the first inner housing 329, and the first inner housing 329 is rotated together with the second inner housing 326 and cannot be rotated by external force.

When the second gear 313 is rotated, the rotational force of the second gear 313 is transferred to the first rotation transfer portion 328 through the rotation shaft 3222, and the first rotation transfer portion 328 is rotated. The first rotation transfer portion 328 pushes and rotates the first roller portions 327 coming in contact with the roller contact surface 3283. In this case, as the first roller portion 327 disposed between the first arc portions 3261 is pushed and rotated, the second inner housing 326 provided with the first arc portions 3261 is pushed by the first roller portions 327 and is also rotated together.

The second roller portion 325 disposed between the second arc portions 3262 is also pushed and rotated in accordance with rotation of the second inner housing 326, and the second rotation transfer portions 324 positioned before the second roller portions 325 in the rotation direction are also rotated together. In this case, the third extension portions 3245 of the second rotation transfer portion 324 are bent toward the first extension portions 3243 by the second roller portions 325 positioned in the rotation direction of the second arc portions 3262 and reduce the rotation speed of the second inner housing 326, and due to this, rotation speed difference occurs between the first rotation transfer portion 328 and the second inner housing 326. The first roller portions 327 are attached to the first inner housing 329 due to the rotation speed difference, and the first inner housing 329 is rotated together with the second inner housing 326 by the first roller portions 327.

Figures 9A, 9B:
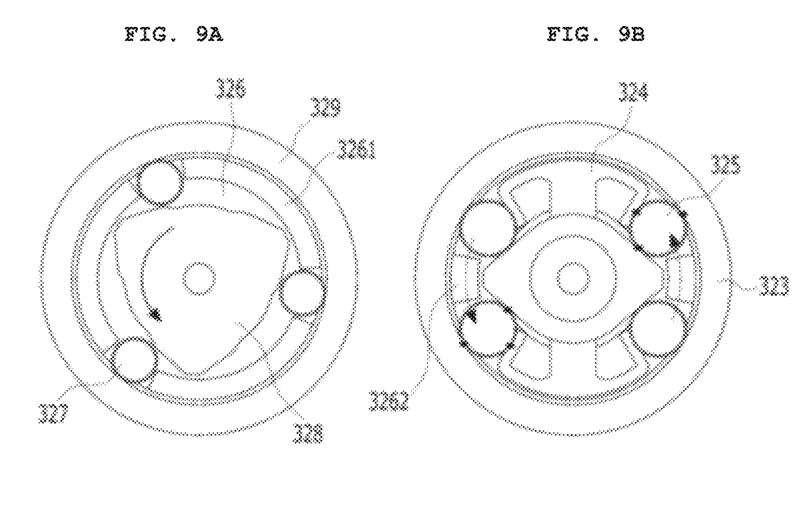
FIGS. 9A and 9B are diagrams illustrating a clutch unit at the time of switching to a free state of an interface device according to an embodiment of the present invention.

FIGS. 9A and 9B are diagrams illustrating the clutch unit 320 at the time of switching to the free state of the interface device 1 according to the embodiment of the present invention. FIG. 9A is a cross-sectional view of the first inner housing 329, the second inner housing 326, the first rotation transfer portion 328, and the like at the time of switching to the free state, and FIG. 9B is a cross-sectional view of the third inner housing 323, the second rotation transfer portion 324, and the like at the time of switching to the free state. In this case, the free state is a state where the first inner housing 329 can be freely rotated by external force. In this case, even when the first inner housing 329 is rotated, the rotational force of the first inner housing 329 is not transferred to the first rotation transfer portion 328.

In the state illustrated in FIGS. 8A and 8B, when the second gear 313 is rotated (hereinafter, referred to as reverse rotation) in a direction opposite to the rotation direction of the second gear 313 illustrated in FIGS. 8A and 8B, the rotational force of the second gear 313 is transferred to the first rotation transfer portion 328, and the first rotation transfer portion 328 is reversely rotated. The first rotation transfer portion 328 reversely rotates the first roller portions 327 coming in contact with the roller contact surface 3283. In this case, as the first roller portion 327 disposed between the first arc portions 3261 is pushed and reversely rotated, the second inner housing 326 provided with the first arc portion 3261 is reversely rotated together by being pushed by the first roller portions 327.

The second roller portion 325 disposed between the second arc portions 3262 is pushed and reversely rotated in accordance with reverse rotation of the second inner housing 326, and the second rotation transfer portion 324 positioned before the second arc portions 3262 in the rotation direction is also reversely rotated. In this case, the third extension portions 3245 of the second rotation transfer portion 324 are bent toward the first extension portions 3243 and reduce the rotation speed of the second inner housing 326, and due to this, rotation speed difference occurs between the first rotation transfer portion 328 and the second inner housing 326. The first roller portions 327 coming in close contact with the first inner housing 329 and the second inner housing 326t are detached from the first inner housing 329 and the second inner housing 326 due to the rotation speed difference.

Thereafter, when the first rotation transfer portion 328 is rotated as much as a space to the extent not to be attached to the first roller portions 327, the first roller portions 327 do not come in contact with the first rotation transfer portion 328 and do not come in close contact with the first inner housing 329 and the second inner housing 326. Accordingly, even when the first inner housing 329 is rotated, configurations of the other parts therein are not rotated in accordance with the rotation of the first inner housing 329. In other words, the first inner housing 329 may be in the free state where it is freely rotatable.

Figure 10:
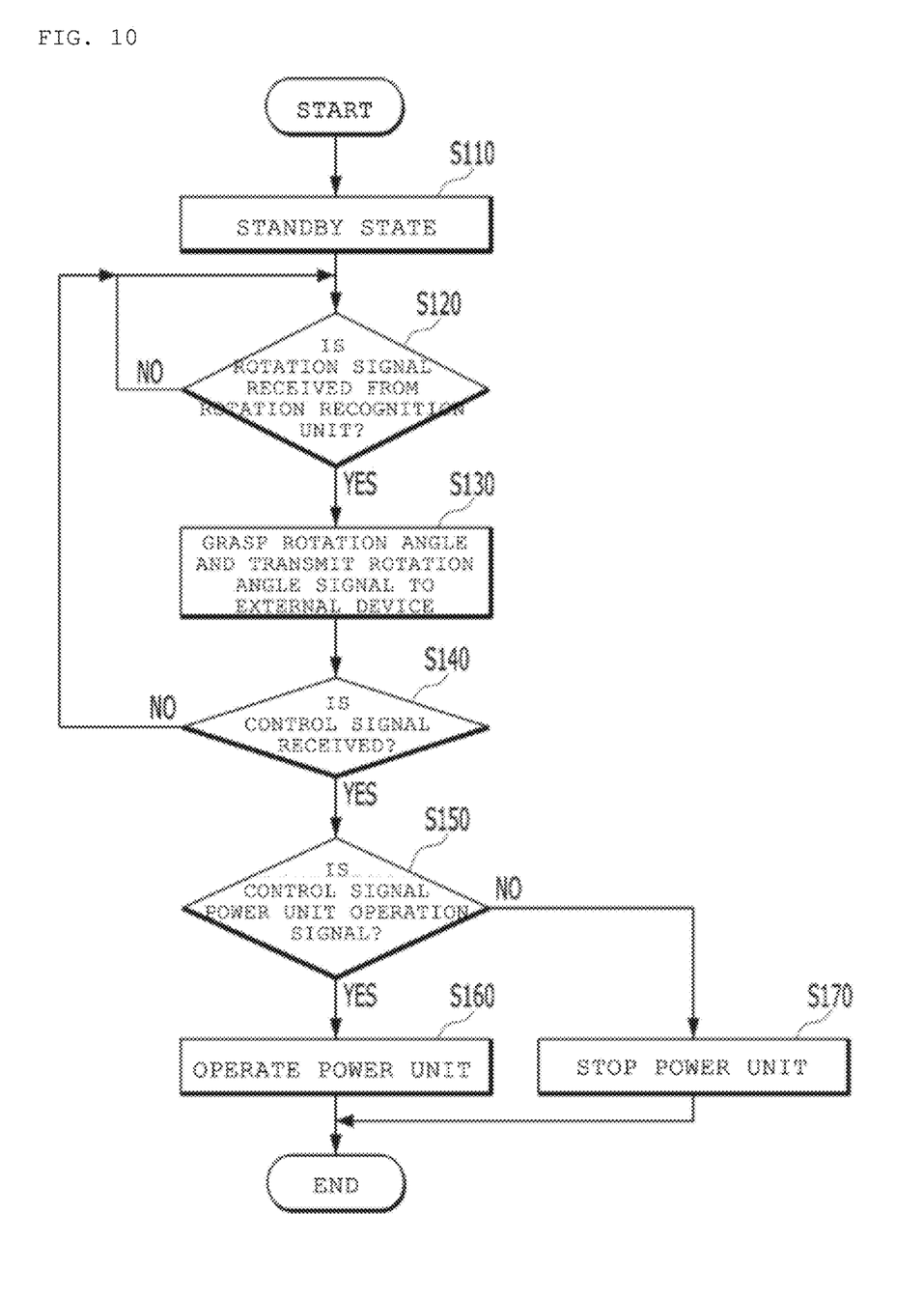
FIG. 10 is a flowchart illustrating a control method of an interface device according to an embodiment of the present invention.

FIG. 10 is a flowchart illustrating a method for controlling the interface device 1 according to the embodiment of the present invention.

In Step S110, the control unit 60 waits for receiving a rotation signal from the rotation recognition unit 340.

In Step S120, the control unit 60 determines whether the rotation signal is received through the rotation recognition unit 340. When it is determined that the rotation signal is received, in Step S130, the control unit 60 grasps a rotation angle on the basis of the rotation signal, and transmits a rotation angle signal including the rotation angle to the external device 2 through the communication unit 70.

After transmitting the rotation angle signal to the external device, in Step S140, the control unit 60 determines whether a control signal is received from the external device 2 through the communication unit 70. When the control signal is received, in Step S150, the control unit 60 determines whether the control signal is a power unit operation signal. When the control signal is determined as the power unit operation signal, in Step S160, the control unit 60 controls the power unit 300 to operate the power unit 300. Herein, the operation of operating the power unit 300 may be operation of operating the motor 301.

In Step S150, when it is determined that the control signal is not the power unit operation signal, in Step S170, the control unit 60 controls the power unit 300 to stop the power unit 300.

In Step S140, when it is determined that the control signal is not received, the process returns to Step S120 and waits for receiving a changed rotation signal.

According to the embodiment of the present invention, since the interface device can implement the free state and the control state, it is possible to improve immersion.

The description of the present invention is just an example, and it could be understood that persons skilled in the art can easily modify the embodiments to a specific form without changing technical spirit or essential characteristics of the present invention. Therefore, it should be understood that the embodiments described above are exemplary in all aspects and are not limitative. For example, each constituent element described in a singular type may be embodied to be distributed, and constituent elements described as being distributed may be embodied in a coupled type likewise.

The scope of the present invention is represented by Claims to be described below rather than Detailed Description, and it should be interpreted that the meaning and scope of Claims and all modifications or modified forms derived from equivalent concept thereof are included in the scope of the present invention.

The description of the present invention is just an example, and it could be understood that persons skilled in the art can easily modify the embodiments to a specific form without changing technical spirit or essential characteristics of the present invention. Therefore, it should be understood that the embodiments described above are exemplary in all aspects and are not limitative. For example, each constituent element described in a singular type may be embodied to be distributed, and constituent elements described as being distributed may be embodied in a coupled type likewise.

The scope of the present invention is represented by Claims to be described below, and it should be interpreted that the meaning and scope of Claims and all modifications or modified forms derived from equivalent concept thereof are included in the scope of the present invention.

A mode for carrying out the present invention has been described together in Description of Embodiments.

INDUSTRIAL APPLICABILITY

The present invention relates to an interface device, can be applied to a device using an interface device, has repetition possibility, and has industrial applicability.

The invention claimed is:

1. An interface device comprising:
 a first fixed portion and a first rotation portion which are fixed to a body;
 a first power portion which is connected to the first fixed portion and the first rotation portion and provides power to the first rotation portion;
 a second rotation portion which is fixed to the body;
 a second power portion which is connected to the first rotation portion and the second rotation portion and supplies power to the second rotation portion; and
 a control unit which controls, when receiving a signal from an external device, the first power portion to control rotation of the first rotation portion, and the second power portion to control rotation of the second rotation portion;
 wherein the first power portion switches the first rotation portion to a free state of being rotatable by external force or a control state of being not rotatable by external force, and
 wherein the second power portion switches the second rotation portion to the free state of being rotatable by external force or the control state of being not rotatable by external force in accordance with a signal of the control unit, and
 wherein the first power portion controls a rotation of the first rotation portion in a first direction, and the second power portion controls the rotation of the first rotation portion in a second direction, the first direction being different from the second direction.

2. The interface device according to claim 1, wherein the first power portion includes a clutch unit, and the first rotation portion is switched to the free state or the control state by the clutch unit.

3. The interface device according to claim 2, wherein the first power portion further includes a power unit, and wherein the clutch unit is switched to the control state when power is supplied by the power unit, and is switched to the free state when the supply of power is cut off by the power unit.

4. The interface device according to claim 3, wherein the first power portion includes an input unit which reduces the rotational force transferred from the power unit, engages with the clutch unit, and transfers rotational force to the clutch unit, and an output unit which engages with the clutch unit, receives the rotational force from the clutch unit, and outputs the rotational force to the first rotation portion or receive rotation of the first rotation portion, and
 wherein the clutch unit controls the rotation of the output unit.

5. The interface device according to claim 1, further comprising:
 an extension portion which is connected to the first rotation portion; and
 a grip portion which is coupled to the extension portion and is gripped by user's hand.

6. The interface device according to claim 5, wherein the grip portion includes a sub-interface device which is interworked with the external device.

7. The interface device according to claim 1, wherein the first power portion includes a rotation recognition unit, and the rotation recognition unit transmits a rotation signal to the control unit when the first rotation portion is rotated.

8. The interface device according to claim 7, further comprising a communication unit which transmits and receives a signal to and from the external device,
 wherein the communication unit transmits a control signal received from the external device to the control unit.

9. The interface device according to claim 8, wherein the control unit grasps, when receiving the rotation signal from the rotation recognition unit by rotation of the first rotation portion, a rotation angle on the basis of the rotation signal, generates a rotation angle signal including the rotation angle, and transmits the rotation angle signal to the external device through the communication unit, or switches the first rotation portion to the free state or the control state in accordance with the control signal when receiving the control signal from the external device through the communication unit.

* * * * *